H. E. TAFT.

LOCK NUT.

APPLICATION FILED SEPT. 12, 1913.

Reissued Jan. 12, 1915. 13,867.

Witnesses

R. D. Tolman.

Penelope Comberbach.

Inventor

Hiram E. Taft.

By Ralph E. Atherton.

Attorney

UNITED STATES PATENT OFFICE.

HIRAM E. TAFT, OF NORTHBRIDGE, MASSACHUSETTS, ASSIGNOR OF ONE-HALF TO EDWARD V. GRANGER, OF BURRILLVILLE, RHODE ISLAND.

LOCK-NUT.

13,867. Specification of Reissued Letters Patent. Reissued Jan. 12, 1915.

Original No. 1,019,379, dated March 5, 1912, Serial No. 554,981. Application for reissue filed September 12, 1913. Serial No. 789,557.

*To all whom it may concern:*

Be it known that I, HIRAM E. TAFT, of Northbridge, in the county of Worcester and Commonwealth of Massachusetts, have invented a new and useful Improvement in Lock-Nuts, of which the following is a specification, accompanied by drawings forming a part of the same.

The object of my invention is to provide a simple and efficient means for causing a nut to be held upon a screw threaded bolt against accidental displacement without the employment of any extra or accessory piece, and it consists in forming a narrow slit in the body of the nut in a plane at an oblique angle to the axis of the nut, and in such a position that a double strain is secured when the nut is screwed firmly into position, one strain being exerted upon that portion of the body of the nut which lies below the slit, and the other strain upon that portion of the body of the nut lying above the slit, as hereinafter described, the novel features being pointed out in the annexed claims.

Figure 1:
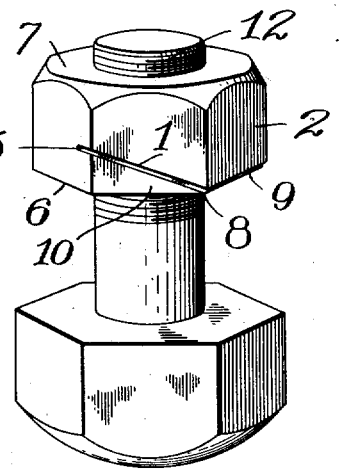
Figure 2:
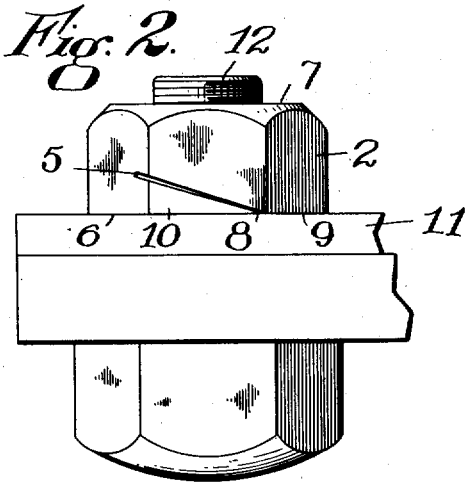
Figure 3:
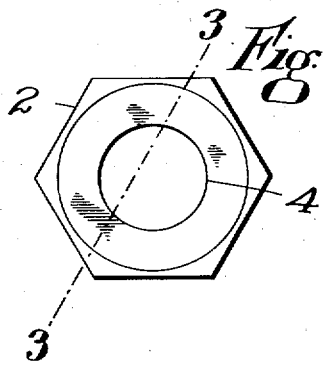

Referring to the accompanying drawings, Figure 1 is a perspective view of a bolt having one of my improved lock nuts applied thereto. Fig. 2 is a side elevation of a bolt and nut, and representing two pieces clamped between the head of the bolt and the nut, and Fig. 3 is a plan view of the nut detached from the bolt.

Similar reference characters refer to similar parts in the different views.

In carrying out my invention I form a slit 1 in the body of the nut and lying in a plane at an oblique angle to the axis of the nut 2. The slit extends from one side slightly past the center of the nut, the bottom of the slit being indicated by the broken line 3—3, Fig. 3, and preferably extending about two thirds of the way through the screw threaded opening 4, which receives the bolt. The inner end 5 or bottom of the slit is located nearer the pressing face 6 of the nut than it is from the top or crown 7 of the nut. I preferably make the distance between the pressing face 6 and the end 5 of the slit about one half the distance between the end of the slit and the crown 7 of the nut.

The lower and outer end 8 of the slit 1 terminates substantially at the edge of the nut, said slit forming with the outer side of the nut an acute angled corner 9 which overhangs the end 8 of the slit, with the inner edge of the slit nearer the face 6 than the crown 7. By this location of the slit 1 a slender triangular tongue 10 is formed on the under side of the nut. As the nut is screwed into bearing position a compression of the tongue 10 takes place, partially closing the slit and bringing a pressure to bear against the corner 9. As pressure upon the nut is increased, a second strain is imparted to the nut by the resulting pressure against the corner 9, said strain being received by the body of the nut above the slit 1. The first strain noted above results in a yielding of the tongue 10, and the second strain results in a yielding of the body of the nut between the crown 7 and the inner end 5 of the slit 1. The two strains imparted consecutively to the nut, namely, the strain upon the tongue 10 and the strain upon the body of the nut above the slit 1 are both produced by the pressure applied directly to the pressing face 6 of the nut against the work 11, or other object to which the nut is applied, and both strains are due to the direct pressure applied to the nut in a line parallel with its axis and caused by the rotation of the nut upon the screw threaded bolt 12.

I do not claim broadly the forming of a split, oblique or otherwise, in the body of a nut, for the sake of weakening the same, and allowing a strain brought upon the nut to tend to deform the nut and produce a pressure upon the screw threads by which the bolt is held in position against accidental displacement.

By my improvement I form the oblique slit 1 in such a position that the resistance to a deforming strain exerted by the tongue will be less than that exerted by the body of the nut above the slit, and the outer end of the slit 1 is so located with reference to the edge of the nut as to form the corner 9 above the plane of the pressing face 6 and overlapping the end of the tongue 10, whereby the first strain upon the nut is received by the tongue and, as the tongue yields, the strain is applied to the body of the nut by reason of the pressure exerted against the contacting corner 9, as the said nut is screwed down upon the bolt.

I have above described the preferred embodiment of my invention. I am aware that the specific construction described may be somewhat modified and still embody the essential feature of my invention, which consists in so forming the substantially triangular tongue 10 that it will be distorted by its pressure against the work sufficiently to contract the outer end of the slit 1, thereby allowing the corner 9 to become seated and cause a second strain to be applied to the body of the nut through the pressure exerted upon the corner 9. This result is contingent upon the formation of an oblique slit in the nut intersecting one of the sides of the nut at or near the angle between such side and the pressing surface of the nut, so that the corner 9 thus formed overhangs the narrow end of the tongue 10. In the embodiment of my invention, I make the slit 1 narrow with its upper and lower walls parallel. In the application of the nut, the strain is first applied to the tongue to carry its outer end toward the body of the nut sufficiently to cause a pressure to be applied to the corner 9 as the nut is screwed still farther upon the bolt, thereby imparting a second strain to the body of the nut through the upward pressure exerted upon the corner 9 at the outer edge of the nut and, therefore, at a maximum distance from the inner end of the slit. At this point the pressure is most effective in applying a strain upon the body of the nut to cause it to pinch the screw threads of the bolt independently of the initial strain applied to the tongue 10.

While the construction shown in the accompanying drawings and herein described I consider a preferable form of embodying my improvement, the gist of my invention consists in the application consecutively of two independent deforming strains, viz., an initial strain which moves the free end of the tongue 10 toward the body of the nut and a secondary strain through pressure applied in an upward direction to the corner 9 at the outer edge of the nut.

My improved lock nut is particularly adapted for use in places wherever a slight lost motion occurs either between the bolt and the work to be clamped, or between the nut and the screw threaded end of the bolt, as in all such cases a slight tipping movement of the nut is permitted, but I have found in practice that the deforming action of a pressure against the bearing face 6 occurs when such lost motion is extremely slight.

I claim,

1. As an article of manufacture, a lock nut having a slit formed in the body of the nut in a plane oblique to the axis of the nut and extending beyond the axis, with the outer edge of the slit terminating substantially at the angle between the pressing surface of the nut and one of its sides and forming a bearing corner overhanging the outer edge of said slit.

2. As an article of manufacture, a lock nut having a slit formed in the body of the nut in a plane oblique to the axis of the nut, with the inner edge of said slit extending partially through the screw threaded opening of the nut and nearer the pressing surface of the nut than the crown, and with the outer edge of said slit terminating substantially at the angle between the pressing surface of the nut and one of its vertical sides, forming a bearing corner overhanging the outer edge of said slit.

3. A lock nut having an oblique slit in the body of the nut, said slit extending upward from the angle between the pressing surface of the nut and one of its vertical sides partially through the screw threaded central opening of the nut, with said pressing surface forming a triangular tongue and also forming a bearing corner at the lower edge of said vertical side, with said bearing corner slightly above said pressing surface.

Dated this eighth day of September 1913.

HIRAM E. TAFT.

Witnesses:
PENELOPE COMBERBACH,
NELLIE WHALEN.